United States Patent

[11] 3,528,350

| [72] | Inventor | Helmut Schmitt<br>Hausen, Germany |
|---|---|---|
| [21] | Appl. No. | 662,482 |
| [22] | Filed | Aug. 22, 1967 |
| [45] | Patented | Sept. 15, 1970 |
| [73] | Assignee | P. Gossen & Co. GmbH.,<br>Erlangen, Bavaria, Germany |
| [32] | Priority | Aug. 24, 1966, July 27, 1967 |
| [33] | | Germany |
| [31] | | G 47,741, G 50,749 |

[54] PHOTORESISTOR CIRCUIT FOR LIGHT MEASURING ARRANGEMENTS
12 Claims, 7 Drawing Figs.

[52] U.S. Cl. .................................................. 95/10,
95/64, 250/209, 250/220, 356/222
[51] Int. Cl. ............................................. G01j 1/44,
G03b 7/04
[50] Field of Search ..................................... 95/10A,
B,C, 64; 250/208, 209, 210, 220, 229;
356/218, 222, 225, 226, 230, 233; 317/124, 127,
148.5; 356/177

[56] References Cited
UNITED STATES PATENTS

| 2,050,737 | 8/1936 | Schriever ..................... | 250/210 |
| 3,024,695 | 3/1962 | Nisbet .......................... | 356/226X |
| 3,214,593 | 10/1965 | Killpatrick ..................... | 250/209X |
| 3,225,646 | 12/1965 | Nagai ............................. | 356/222 |
| 3,321,630 | 5/1967 | Durig et al. ..................... | 250/209 |
| 3,340,764 | 9/1967 | Bergson ......................... | 356/177 |
| 3,441,835 | 4/1969 | Hekrole ......................... | 356/222 |

Primary Examiner—Norton Ansher
Assistant Examiner—Joseph F. Peters, Jr.
Attorneys—Nolte and Nolte ABSTRACT: A photoresistor circuit for light measuring devices for use with photocameras in which a pair of photoresistors are connected in a voltage divider relationship across a source of potential and are under constant illumination by a light source. While one of the photoresistors is also illuminated by the light received from the object being photographed, whereby the time delay and light memory effects adversely accompanying the photoresistors are eliminated.

*INVENTOR.*
HELMUT SCHMITT

3,528,350

PHOTORESISTOR CIRCUIT FOR LIGHT MEASURING ARRANGEMENTS

BACKGROUND OF THE INVENTION

1. Field of the Invention

This invention relates to a light measuring circuit arrangement and, more particularly, to a circuit arrangement having photoresistors therein connected in voltage divider relationship with a source of potential and being exposed to a constant and to a differential light intensity.

2. Description of the Prior Art

Photoresistors, instead of photo-voltaic elements, have found a steadily growing application in photographic exposure meters and exposure control units, since by means of the former a higher sensitivity can be attained. A disadvantage accompanies the photoresistors in that they require the use of a battery. However, with the advance of the technology electronic circuits are more frequently employed in exposure meters and exposure control units, which circuits require the presence of a battery in any case. Therefore, the above-mentioned drawback of photoresistors when compared with those of selenium photoelectric elements, for example, is negligible. Nevertheless, even in the case of electronic circuits, there are still two undesired properties of photoresistors present, namely the time delay and the so-called light memory. The time delay is longest when the illumination intensity is low; the light memory more adulterates the result of measurement when the difference between the light intensity to which the photoresistor has been exposed to before the measurement, and that which is being measured is greatest.

SUMMARY OF THE INVENTION

It is, therefore, the primary object of this invention to eliminate effectively the above-mentioned defects, namely the time delay and light memory in electronic exposure meters and exposure control units.

According to the present invention, this object is attained, so that a pair of photoresistors are connected to form a voltage divider, both photoresistors being permanently and constantly illuminated by an internal light source and that one of the photoresistors is additionally exposed to the light reflected by the object being photographed.

It is the advantage of this arrangement that, due to the additional illumination, the actual measuring photoresistor operates at a higher light level whereby its time delay is considerably reduced.

Furthermore, in view of the additional illumination, the ratio between both illumination intensities to which the photoresistor is exposed during the measurement of two different objects, is diminished so that the error arising from the light memory is considerably reduced.

As a consequence of the constant illumination of both photoresistors, the intensity variations of the light source which constantly illuminates both photoresistors have no influence on the measurement.

The manner in which the above objects of the invention are accomplished is more fully described below with reference to the attached drawings.

DESCRIPTION OF THE PREFERRED EMBODIMENTS

Figure 1:
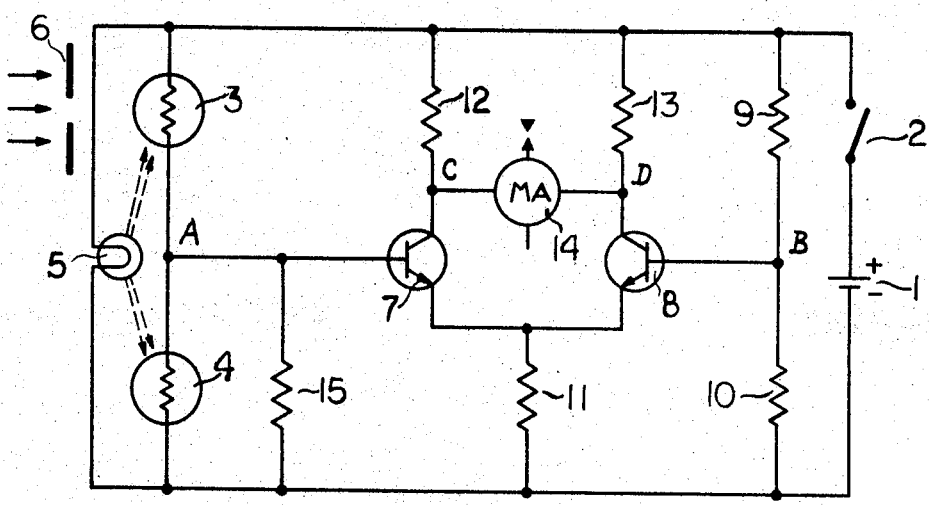
FIG. 1 is a schematic diagram of one embodiment of the photoresistor circuit according to this invention.

The first exemplary embodiment of this invention is shown in FIG. 1, representing an electronic balanced exposure meter or exposure control unit provided with a null galvanometer. Both photoresistors 3 and 4 are connected in a series with battery 1 and switch 2. A small pilot lamp 5 is arranged in parallel to the photoresistors and after switching on switch 2, it illuminates constantly both photoresistors 3 and 4. In front of the photoresistor 3 there is provided an adjustable light attenuator 6, such as an adjustable diaphragm. A differential amplifier is operatively connected to the photoresistor voltage divider which is formed by photoresistor 3 and photoresistor 4. For this purpose, the top A of the photoresistor voltage divider is connected to the base of a first transistor 7, whereas a second transistor 8 has its base connected to the top B of a voltage divider which is formed by ohmic resistors 9 and 10 having their end terminals connected also in series with battery 1 and switch 2. The emitters of both transistors 7 and 8 are connected via a resistor 11 to the minus pole of battery 1, whereas the collectors are connected via resistors 12 and 13, respectively, to the plus pole of battery 1. Between the connection point C of transistor 7 and resistor 12 on the one hand and the connection point D of transistor 8 and resistor 13 on the other hand, a null galvanometer 14 is connected. A resistor 15, connected in parallel to the photoresistor 4 is used to adjust the characteristic curve of the latter to that of photoresistor 3.

The above-described arrangement operates as follows: After the switch 2 has been closed, the pilot lamp 5 illuminates both photoresistors 3 and 4. The photoresistor 3 is in addition also exposed to the light reflected from the object being photographed and passing through the adjustable diaphragm 6. The photoresistor voltage divider formed by photoresistors 3 and 4 controls transistor 7, whereas transistor 8 is controlled by means of an ohmic voltage divider formed by resistors 9 and 10. In response to the illumination intensity upon photoresistor 3 which is affected by the incident light, electric current flows through the null galvanometer 14 either in the one direction or in the opposite one. The null instrument current may be set or balanced by adjusting the light attenuator 6, to vary the illumination intensity on photoresistor 3.

Figure 5:
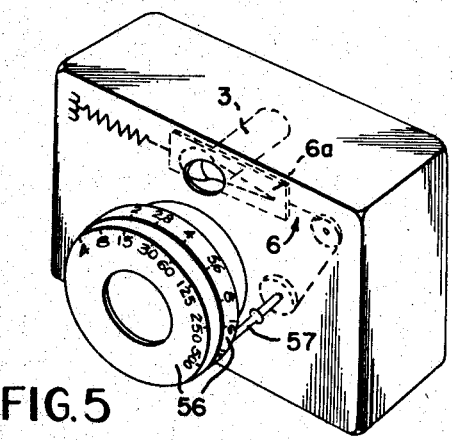
FIG. 5 shows a camera with adjusting means for the light attenuator coupled to the camera settings.
Figure 6:
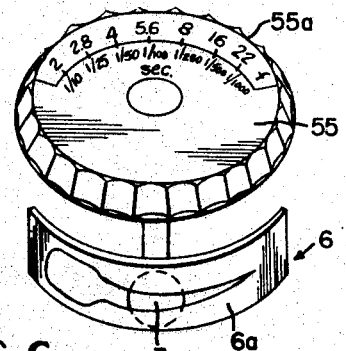
FIG. 6 shows the light attenuator coupled with a graduated ring of a manual exposure meter.

As shown in FIG. 6, the adjusting member of the light attenuator 6 is, in case of a manual exposure meter, coupled with a knob 55 provided with a scale means, such as, for example, a graduated ring 55a. Provided that the exposure control unit is present in the camera 58, as illustrated in FIG. 5, then the adjusting member 6a is coupled by coupling means 57 with the setting means 56 of the camera.

Figure 2:
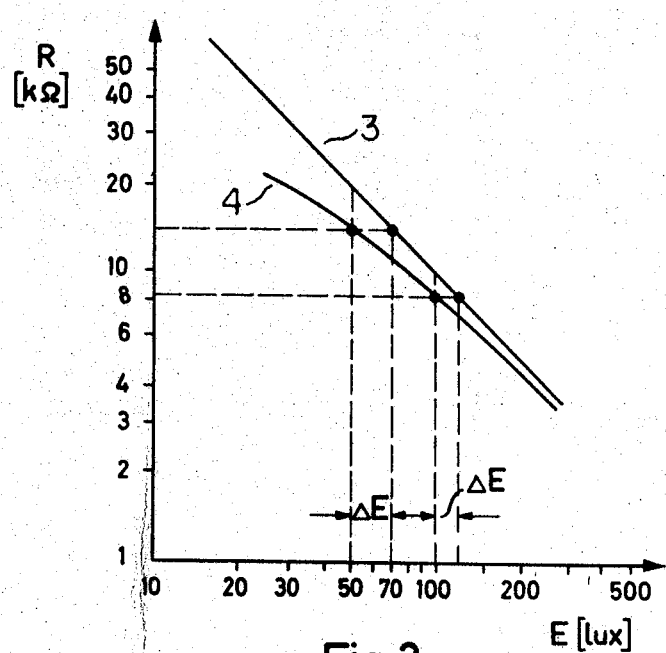
FIG. 2 is a graph showing the relation between the resistance of the photoresistors of FIG. 1 and the illumination.

The mode of operation of the resistor 15 will now be described in more detail. Even if the pilot lamp 5 transmits less light due to its natural aging or due to low voltage in the battery, no adulteration of the measurement will occur. Be assured that no current flows through the galvanometer 14 if an equal voltage drop is on photoresistors 3 and 4, the characteristic curves of which, $R = f(E)$ (whereby $R$ = the resistance of photoresistors in K ohms and $E$ = the illumination in lumen) being graphically illustrated in FIG. 2. For example, the pilot lamp 5 illuminates the photoresistors 3 and 4 by 100 lumen, respectively. Due to this action, the photoresistor 3 has a resistance value of 10K ohms and the value of the photoresistor 4 is 8.2K ohms. Now, when the light reflected from the object being photographed increases the illumination intensity on the photoresistor 3 to an extent when a resistance ratio 1:1 sets in, then the galvanometer 14 is without current again. In the aforementioned example, an additional illumination $\Delta E = 20$ lumen is necessary to attain the above result.

If the photoresistors 3 and 4 due to the decreased brightness of the pilot lamp 5 are illuminated by 50 lumen each, the resistance ratio still must be 1:1 when an additional illumination $\Delta E = 20$ lumen falls upon the photoresistor 3. This fact may be deduced from the graph shown in FIG. 2. This behavior characteristic is attained by the appropriate selection of resistor 15.

Figure 3:
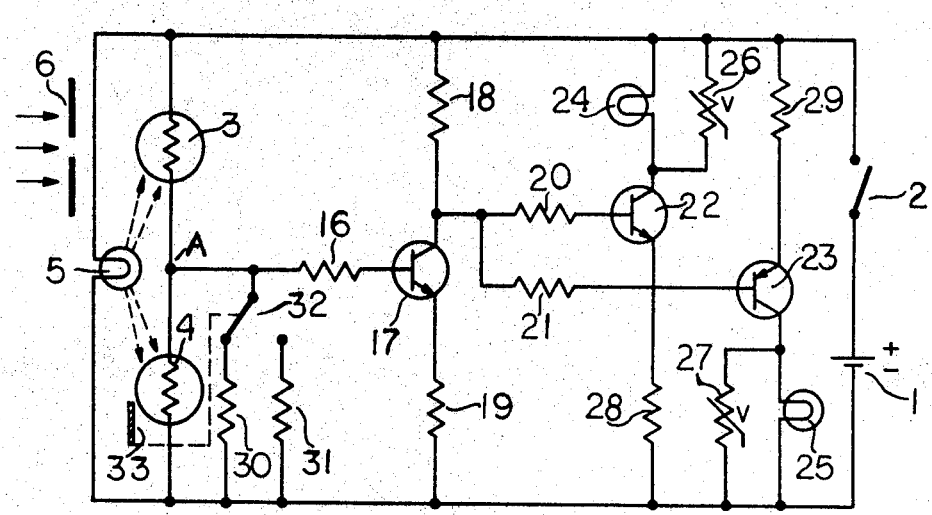
FIG. 3 is a schematic diagram of another embodiment of the photoresistor circuit for exposure meters or exposure control units.

In FIG. 3 there is illustrated a further modification of the present invention. In this embodiment a balanced exposure meter or exposure control unit is shown wherein the balanced condition is indicated by means of two signal lamps. The basic circuit consists again of a battery 1, switch 2, two photoresistors 3 and 4, illuminating pilot lamp 5 and light attenuator 6.

A preamplifier is provided for the photoresistors 3 and 4, consisting of a resistor 16, transistor 17 and of resistors 18 and 19. The bases of transistors 22 and 23 are respectively connected via resistors 20 and 21 to the collector of the transistor 17, whereby transistor 23 conducts oppositely to transistor 22. Indicator lights 24 and 25 are connected in the collector circuits of transistors 23 and 24. Each of these indicator lights is bridged by a voltage sensitve resistor 26, respectively 27.

The emitter resistances 28 and 29 are employed for adjusting the indicator lights with respect to each other. In parallel with the photoresistor 4 there are arranged two resistors 30 and 31 from which only one is, by means of a switch 32, inserted into top A of the photoresistor voltage divider. In addition to that a further light attenuator means 33, for example a filter, is provided and is mechanically coupled with switch 32 so that it may be moved in front of the photoresistor 4 during the insertion of the resistor 31 as mentioned above.

This arrangement operates in such a manner that, after switch 2 has been activated, the pilot lamp 5 glows and continuously illuminates the photoresistors 3 and 4. The photoresistor 3 is, in addition to that, illuminated by the light reflected from the object being photographed and passing through the diaphragm 6. The potential on top A between photoresistors 3 and 4, which varies according to the intensity of the illumination on photoresistor 3 by the light reflected from the object being photographed, controls transistor 17 which in turn controls transistors 22 and 23. Since the respective transistors 22 and 23 conduct oppositely therefore, during a change of the illumination intensity on photoresistor 3, one of the respective indicator lights 24 and 25 will glow brighter. Only in case of a quite specific illumination intensity upon the photoresistor 3, both indicator lights 24 and 25 will glow equally bright. Such a balanced condition is adjusted by means of the light attenuator 6. The operating member of this light attenuator 6 is here, as in the previous case, coupled with a scale means when used in an exposure meter and with a setting means in a camera when an exposure control unit is present.

The selection of a second measuring range is accomplished by disconnecting resistor 30 with switch 32 and connecting resistor 31 into the circuit. At the same time the filter 33 is moved in front of the photoresistor 4. In this manner the operating point of the circuit has been shifted and the indicator lamps 24 and 25 in case of a changed illumination intensity upon the photoresistor 3 will glow equally bright.

Figure 4:
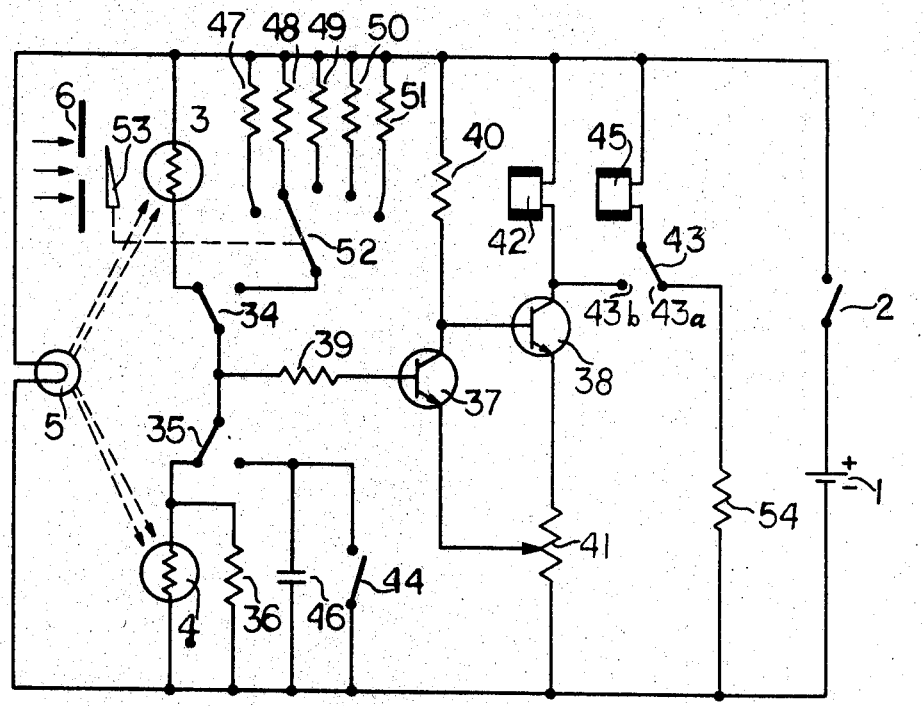
FIG. 4 is a schematic diagram of the photoresistor circuit according to this invention as used in connection with a light responsive adjustment of electronically controlled shutters in cameras.

The circuit according to this invention may be used not only with exposure meters or exposure control units but also with a light-responsive control means of electronic shutters in cameras. An example of one embodiment of the latter type application is illustrated in FIG. 4. As in previous embodiments, according to this invention, the basic circuitry consists of a battery 1, switch 2, two photoresistors 3 and 4, illuminating pilot lamp 5 and light attenuator 6. Moreover, two switches 34 and 35 are connected between the the respective photoresistors 3 and 4. A resistor 36 corresponding to the resistor 15 in FIG. 1, and to resistors 30, respectively 31 in FIG. 3, is connected in parallel with the photoresistor 4 to correct the characteristic of the latter.

Furthermore, there is provided a Schmitt trigger circuit consisting of two transistors 37 and 38 and resistors 39, 40 and 41. An electromagnet 42, the armature of which, when released causes the opening of the camera shutter (not shown in the drawings), is connected in the collector circuit of transistor 38. The armature of the electromagnet 42 or a linkage cooperating therewith also by being released actuates successively switches 34, 35, 43 and 44. The switch 43 is mechanically designed so as to disconnect the contact 43a only then, if the contact 43b has been established. An electromagnet 45 which causes the closing of the shutter for the camera, is also connected with the battery 1 by means of contact 43a of the switch 43.

By switching-over the switches 34 and 35, the capacitor 46 and one of the resistors 47 to 51 instead of the photoresistors 3 and 4 are connected via switch 52 to the Schmitt trigger input.

The time of opening of the shutter of the camera is set by the preselection of resistors 47 to 51. A switch 52 is mechanically coupled with a light attenuating member 53, such as for example a grey wedge. The resistor 54 is connected in switch position 43a in series with the electromagnet 45 and is used for current attenuation.

Before going into a detailed discussion of the mode of operation it is noted that the shutter of the camera (not shown) during the initial position of the arrangement as shown in FIG. 4, is in a cocked condition whereby the diaphragm of the shutter and consequently the light attenuator 6 coupled therewith in front of photoresistor 3, are locked at the smallest opening positions and the switches are in positions as illustrated. The armatures of both electromagnets 42 and 45 are, during the above described operational phase, mechanically forced against the electromagnets, and arrested. This mechanical pressing is necessary because both electromagnets 42 and 45 are designed such that when being energized they are not actually capable of holding their armatures and do not require to be mechanically held down. They are, however, unable to pull in. For this reason the pulling action in the initial position can be effected by mechanical means only.

Starting is effected by turning on the switch 2. By this action the pilot lamp 5 illuminates photoresistors 3 and 4. The illumination intensity upon photoresistors 3 and 4 is selected so as to adjust the voltage drop across photoresistor 4 immediately below the threshold value of the Schmitt trigger circuit, e.g. in that resistor 37 is cut-off and transistor 38 conducts. As a consequence, the electromagnet 42 is energized. The switch 43 is in the switching position as shown in FIG. 4, that is in contact position 43a. Also, electromagnet 45 has been energized by the closing of switch 2. The mechanically locking of both armatures as well as of the diaphragm 6 is now released by further holding down switch 2. The diaphragm (light attenuator) 6 will open now only by means of a spring force. In the course of this opening motion the illumination intensity upon photoresistor 3 keeps increasing whereby the resistance of the latter becomes lower, and the current flowing therethrough increases. Consequently, the voltage drop across photoresistor 4 rises. The diaphragm (light attenuator) is opened until the threshold voltage of the trigger circuit is attained and, consequently, the trigger circuit reverses to its opposite state. The transistor 38 is now being cut-off and transistor 37 is conducting so that the armature of electromagnet 42 is released and successively launches the following process: the diaphragm or light attenuator 6 as well as the diaphragm of the photographic objective coupled with the former, are stopped in their opening movement; at the same time switches 34, 35 and 43 are switched-over; the switch 44 is opened; and the shutter opening ring is released so that the shutter opens.

Figure 7:
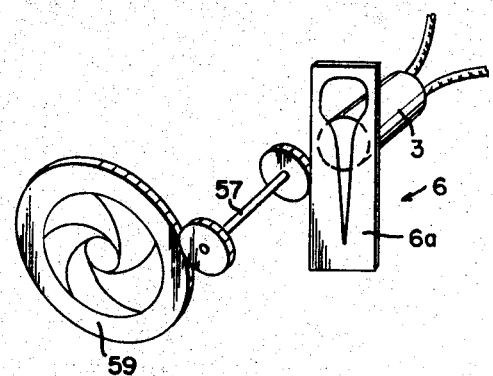
FIG. 7 illustrates in more detail the coupling of the light attenuator to the objective diaphragm.

By opening switch 44 the shorting of capacitor 44 is interrupted. The trigger circuit is momentarily switched over to its initial state because the threshold value on the control input has fallen. The transistor 34 in this way is cut-off again, whereas the transistor 38 conducts. Thereby electromagnet 42 becomes again energized but its armature remains released, as previously discussed. Moreover, by opening switch 44 the capacitor 46 is charged from the inserted battery voltage via one of preselected resistors 47 to 51. As a consequence of the above described particular design of switch 43, the armature of the electromagnet 45 remains pulled-up. Switch 43 has actually been switched over from the contact postion 43a to contact position 43b. The current, however, has not gone below the releasing magnitude of the electromagnet 45. The latter is connected in parallel to electromagnet 42 which, by means of the again conducting state of transistor 38, is anew energized and the armature of which becomes released. As soon as the capacitor 46 becomes charged to the threshold voltage of the trigger circuit, the latter reverses again to its second state. Thereby, the electromagnet 45 is switched off, its armature released and consequently it effects closing of the shutter. By this action one run is finished. Prior to starting another run, the shutter has to be biased whereby the armature and switches are set to their initial positions and simultaneously the diaphragm or light attenuator 6 in front of photoresistor 3, which is coupled with the diaphragm 59 of the objective as shown in more detail in FIG. 7, is readjusted to its smallest transit aperture.

I claim:

1. A circuit arrangement for absolute measurement of light, comprising a power supply, at least a pair of photoresistors connected in series to said power supply to form a voltage divider circuit, a light source to equally illuminate said photoresistors, and means for additionally exposing only one of said photoresistors to an unknown light quantity to be measured.

2. The circuit according to claim 1 wherein a differential amplifier has the input thereof connected to said photoresistor voltage divider circuit, a null indicator connected to the output of said amplifier, and a light attenuating means disposed in front of said one photoresistor which is exposed to the additional light quantity.

3. The circuit according to claim 2 for the use in an exposure meter, wherein said light attenuating means comprises an adjusting member coupled with a controlling means, such as a slide ring.

4. The circuit according to claim 2 for the use in an exposure control unit, wherein said attenuating means is coupled with setting means of a camera.

5. The circuit according to claim 4, further comprising a voltage divider resistor network connected across said power supply, said differential amplifier comprises a pair of transistors having a base, an emitter and a collector electrode, the base electrode of one of said transistors being connected to said photoresistor voltage divider circuit, the base electrode of another of said transistors being connected to said voltage divider resistor network, said null indicator being connected across the collector electrodes of said transistors.

6. A circuit arrangement comprising a power supply, at least a pair of photoresistors connected in series to said power supply to form a voltage divider circuit, a light source to illuminate said photoresistors, means for additionally exposing one of said photoresistors to an unknown light quantity to be measured, a two state transistor amplifier connected to the output of the photoresistor voltage divider, indicator light connected to the output of each stage of said transistor amplifier, an adjustable light attenuating device disposed in front of said one photoresistor which is exposed to the additional light quantity.

7. The circuit according to claim 6 for the use in an exposure meter, wherein said light attenuating means comprises an adjusting member coupled with a controlling means, such as a slide ring.

8. The circuit according to claim 6 for the use in an exposure control unit, wherein said attenuating device is coupled with setting means of a camera.

9. The circuit according to claim 1 for the light responsive control of an electronically regulated camera shutter, wherein a light attenuating means is coupled with the objective diaphragm of the camera, switching means responsive to the additional light quantity falling upon the said one photoresistor, electromagnet means energized by said switching means and actuating the objective diaphragm and the objective shutter of the camera.

10. The circuit according to claim 1, further comprising resistor means connected in parallel to one of said photoresistors to adjust their characteristic curves.

11. A circuit arrangement comprising a power supply, a pair of photoresistors connected in series to said power supply to form a voltage divider circuit, a light source positioned to illuminate each of said photoresistors, means for additionally exposing only one of said photoresistors to an unknown light quantity, a trigger circuit electromagnet connected to the output of said trigger circuit, a capacitor charging circuit, and switch means for alternately connecting the input of said trigger circuit to said voltage divider circuit and said charging circuit.

12. The circuit arrangement of claim 11 wherein said electromagnet means comprises a first electromagnet connected in said output circuit when said input circuit is connected to said divider circuit, and a second electromagnet connected in said output circuit when said input circuit is connected to said charging circuit.